3,399,192
1-OXA-2-OXO 3,8-DIAZA SPIRO (4,5) DECANES
Gilbert Regnier, Sceaux, Roger Canevari, La-Haye-les-Roses, and Jean-Claude Le Douarec, Suresnes, France, assignors to Science Union et Cie, Societe Francaise de Recherche Medicale, Suresnes, Hauts-de-Seine, France
No Drawing. Filed Apr. 14, 1965, Ser. No. 447,952
Claims priority, application Great Britain, Apr. 22, 1964, 16,696/64
22 Claims. (Cl. 260—240)

ABSTRACT OF THE DISCLOSURE 1-oxa-2-oxo 3,8-diaza spiro (4,5) decanes and acid addition salts thereof. The compounds are useful as bronchodilators, analgesics, and anti-inflammatory agents.

---

The present invention provides, as new compounds, spiro (4,5) decane derivatives of the general formula:

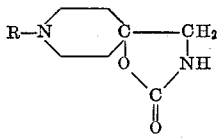

in which the substituent R may represent:
 a hydrogen atom,
 a lower-alkyl radical containing up to 4 carbon atoms inclusive or an Ar—A— grouping
in which Ar and A may have the following meanings:
  (a) Ar may be
   a phenyl radical or
   a phenyl radical mono- or di-substituted by the following substituents: halogen atoms such as F, Cl or Br, $CF_3$ radicals, lower-alkyl radicals containing up to 5 carbon atoms inclusive, lower-alkoxy radicals containing up to 5 carbon atoms inclusive, methylene-dioxy radicals —O—$CH_2$—O—, hydroxy or carbomethoxy —$COOCH_3$ groups,
   a pyrimidyl or
   a tetrahydrofuryl radical
  (b) A may be
   a polymethylene arrangement in the form of a straight or branched chain —$(CH_3)_n$—, in which $n$ in any event may have a value of from 1 to 4, including also polymethylene arrangements in the form of branched chains, such, for example, as

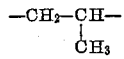

or such chains substituted by an aromatic nucleus, such for example,

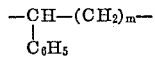

wherein $m$=0, 1 or 2, such further carbon chains comprising:
   a double bond, such, for example, as —CH=CH—$CH_2$—,
   a secondary alcohol group such, for example as —$CH_2$—CHOH—$CH_2$—,
   an ether group such, for example, as —$OCH_2CH_2$— or
   an amide group such, for example, as —NH—$COCH_2$—.

The new spiro (4,5) decane derivatives may be prepared by the following methods: An amino alcohol of the general formula

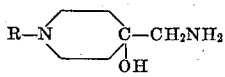

in which R has the meaning as defined above with the exception of H, is reacted with a carbonic acid derivative, which may be an acid chloride (for example, phosgene), an ester (for example, ethyl carbonate) or an amide (for example, urea).

The reaction process is illustrated in reaction Formula I hereunder:

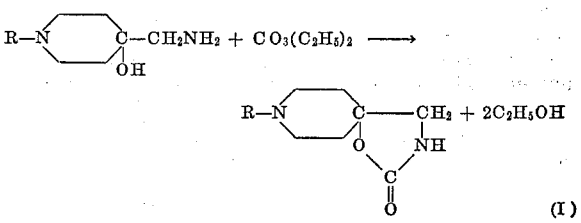

(I)

In the production of the products defined above, which have a nitrogen containing ring, from the starting amino alcohols, it is advantageous to use an ester of carbonic acid, the one most commonly employed being ethyl carbonate, although the reaction may be carried out just as well with methyl, butyl, or other lower-alkyl carbonate. The use of phosgene or urea as cyclisation agents is less advisable because, in some cases, the reaction takes place with a low yield of desired product and the recovery of the starting amino alcohol is difficult and tedious.

An especially advantageous way of carrying out the above process with the materials mentioned comprises heating the chosen amino alcohol in solution in a large excess of ethyl carbonate as solvent, in the presence of a small quantity of an alkali metal alcoholate as catalyst, the most usual being sodium methylate of ethylate. The duration of heating in such case is dependent on the boiling temperature of the reaction mixture, which rises gradually as the alcohol formed during the reaction is distilled (see reaction Formula I) from 70—75° C. to 120—125° C., this being the temperature limit marking the completion of the reaction.

The new compounds of the invention may also be prepared by a process which comprises reacting a spiro (4.5) decane derivative of the general formula:

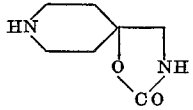

with a halogenated derivative R—Hal, in which R has the meaning as hereinbefore defined, excepting H, and Hal represents a chlorine, bromine or iodine atom.

This reaction process is illustrated in Formula II hereunder:

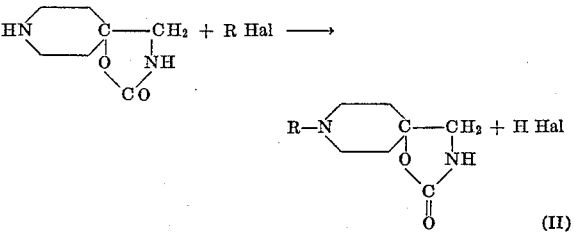

(II)

It is advantageous to conduct the reaction in a solvent for the starting piperidine, the most suitable of such solvents consisting of a mixture of a benzene hydrocarbon, such, for example, as toluene or xylene, with a tertiary amide such, for example, as dimethyl formamide or dimethyl acetamide, advantageously in proportions substantially equal to two parts of hydrocarbon to one part of amide. It is also possible to carry out the process in an alcohol of low molecular weight such, for example, as ethanol or isopropanol, or one of the pure benzene hydrocarbons mentioned hereinbefore, but in such case the reaction velocity is slow and the yield is less satisfactory.

A preferred method of carrying out such a reaction comprises reacting the R—Hal compound with the piperidine as defined above in solution in an appropriate solvent in the presence of an alkaline agent which will neutralise the acid formed in the course of the reaction and which is chosen from among the alkali metal or alkaline-earth metal carbonates or from among the aliphatic tertiary bases such, for example, as triethylamine, or the aromatic tertiary bases such, for example, as dimethylaniline or pyridine. The reaction temperature may in such case advantageously range from 110° to 120° C.

The new spiro (4,5) decane derivatives, which are strong bases, can be purified by physical methods such, for example, as crystallisation or chromatography, or chemical methods, such, for example, as the formation of salts with mineral or organic acids, crystallisation thereof in an appropriate solvent and decomposition thereof in an alkaline medium. In these operations the nature of the anion is immaterial, to such extent as it results in a well-defined and easily crystallisable salt. In general, these bases will be kept in the form of addition salts. As addition salts with mineral acids there may, moreover, be mentioned the hydrochloride, hydrobromide, sulphate, phosphate, methanesulphonate and with organic acids, the acetate, propionate, maleate, fumarate, succinate, benzoate, tartrate, malate and oxalate.

The new spiro (4,5) decane derivatives of the invention and their physiologically tolerable addition salts possess valuable pharmacological and therapeutic properties and may be used as medicaments, especially as bronchodilators, analgesics and anti-inflammatory agents.

Their toxicity is low and the LD 50 is from 127 to 978 mg./kg. in mice when administered intraperitoneally.

The bronchodilator activity was studied in the guinea pig by the test of H. Konzett and R. Rosler (Arch. Exptl. Path. U. Pharm. 195, 71, 1940).

It was found that when the compounds were administered intravenously at the dose of 0.5 to 1.0 mg./kg., they inhibited completely the bronchospasm provocated by histamine or serotonin.

They possess also anti-inflamatory properties as demonstrated on the plantar oedema of the rat's paw induced by subaponeurotic injection of kaolin. Several compounds of the invention inhibit inflamation up to 40% in comparison with untreated animals, when administered orally at the dose of 100 to 200 mg./kg. over a period of 3 days.

The analgesic activity was demonstrated by the hot plate test in mice. It was found that, when the compounds were administered intraperitoneally at a dose of 30 to 50 mg./kg., the threshold of pain perception of the animals increased up to 100% in comparison with those untreated.

The compounds of the invention may be used as medicaments in the form of pharmaceutical compositions containing the compounds in admixture or conjunction with a pharmaceutical organic or inorganic, solid or liquid carrier for oral, rectal or parenteral administration. The doses can vary from about 0.10 to about 1.0 gr. per day.

The following examples illustrate the process for preparing the new compounds and are not to be construed as limiting. Melting points indicated were determined by the Kofler method under microscope.

Example 1.—1-oxa-2-oxo 3,8-diaza 8-benzyl spiro (4,5) decane

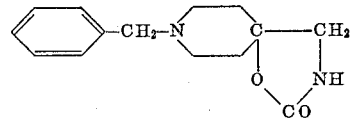

A solution of 192 grams of 1 - benzyl - 4 - hydroxy - 4 aminomethyl piperidine in 800 cc. of ethyl carbonate is heated for 2½ hours to reflux at about 80° C. in the presence of sodium methylate (prepared for immediate use from 2 grams of sodium). After this time, the ethyl alcohol formed during the reaction is slowly distilled while the maximum temperature is reached. The excess ethyl carbonate is distilled under reduced pressure. A crystallised residue is then obtained, which is stirred with 400 cc. of water and 400 cc. of ether. The solution is filtered and 125 grams (77.6%) of practically pure product melting at 177/178° C. are obtained.

By starting with the corresponding fluoro, chloro, bromo, trifluoromethyl, lower-alkyl, lower-alkoxy, methylene dioxy, carbomethoxy or like substituted 1-benzyl-4-hydroxy - 4 - aminomethyl piperidine compound correspondingly substituted end products are produced.

The starting 1-benzyl-4-hydroxy-4-aminomethyl piperidine, the dihydrochloride of which melts at 267/268° C., was prepared in a yield of 58% by reduction of the corresponding cyanohydrin, melting at 102° C., in tetrahydrofuran by means of aluminium alanate. The substituted 1-benzyl compounds are prepared in the same manner.

The following compounds were prepared by the same method:

(a) 1-oxa-2-oxo 3,8-diaza 8-phenethyl spiro (4,5) decane

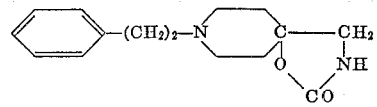

the hydrochloride of which melts at 232/233° C.

The starting 1 - phenethyl - 4 - hydroxy-4-aminomethyl piperidine, the dihydrochloride of which melts at 265° C., was prepared in a yield of 55% from the corresponding cyanohydrin melting at 75° C.

(b) 1-oxa-2-oxo 3,8-diaza 8-γ-phenyl propyl spiro (4,5) decane

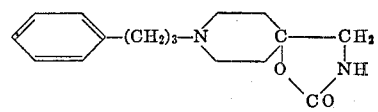

The base melts at 143° C.

The corresponding hydrochloride melts at 201–202° C.

The starting 1 - (γ - phenyl-propyl)-4-hydroxy-4-aminomethyl piperidine, the hydrochloride of which melts at 230° C., was prepared in a yield of 53% from the corresponding cyanohydrin melting at 101° C.

(c) 1-oxa-2-oxo 3,8-diaza 8-phenyl isopropyl spiro (4,5) decane

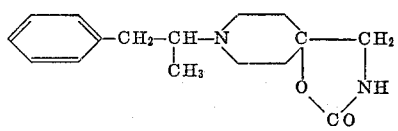

The base melts at 248° C.

The starting 1-phenylisopropyl-4-hydroxy-4-aminomeethyl piperidine, the dihydrochloride of which melts at 200° C., was prepared in a yield of 38% from the corresponding cyanohydrin melting at 95° C., which was itself prepared from 1-phenylisopropyl-4-piperidine boiling at 133–136° C. under a pressure of 0.8 mm. column of mercury ($n_D^{25} = 1.5295$).

(d) 1-oxa-2-oxo 3,8-diaza 8-methyl spiro (4,5) decane

The corresponding hydrochloride melts at 243–244° C.

The starting 1-methyl-4-hydroxy-4-aminomethyl piperidine, the dihydrochloride of which melts at 207° C., was prepared in a yield of 41% from the corresponding melting at 145° C.

Example 2.—1-oxa-2-oxo 3,8-diaza 8-cinnamyl spiro (4,5) decane

To a solution of 4.7 grams of 1-oxa-2-oxo 3,8-diaza spiro (4,5) decane in a mixture of 47 cc. of dimethyl formamide and 80 cc. of anhydrous toluene there are added 4.1 grams of anhydrous potassium carbonate and 5 grams of cinnamyl chloride. The mixture is then heated to reflux for 12 hours and the salt formed is filtered. The solvent is evaporated under reduced pressure. 50 cc. of water are added to the residue and the product crystallises. This is dried without heating and washed with water and ether. In this way, 3.9 grams of crude base are obtained which, on being recrystallised from isopropanol, finally give 2.7 grams of crystals melting at 176° C. Yield 33%.

The starting 1-oxa-2-oxo 3,8-diaza spiro (4,5) decane was obtained, in a yield of 84%, by debenzylation of the 1-oxa-2-oxo 3,8-diaza 8-benzyl spiro (4,5) decane described in Example 1 in glacial acetic acid by means of palladium on carbon (containing 10% of palladium) under a hydrogen pressure of 30 atmospheres, at a temperature of 80° C.

The corresponding hydrochloride melts at 275–279° C.

The following were prepared by the same method as that used in Example 2:

(a) 1-oxa-2-oxo 3,8-diaza 8-phenoxy ethyl spiro (4,5) decane from phenoxyethyl bromide. Yield 56%. The base melts at 138° C. and the corresponding hydrochloride melts at 225–227° C.

By using phenoxypropyl bromide or other phenoxy lower-alkyl halide instead of the phenoxyethyl bromide, the corresponding phenoxylower-alkyl product is produced.

(b) 1-oxa-2-oxo 3,8-diaza 8-diphenyl methyl spiro (4,5) decane from diphenyl methyl bromide. Yield 31%. The base melts at 200° C.

(c) 1-oxa-2-oxo 3,8-diaza 8-(3'-phenyl 2'-hydroxy propyl) spiro (4,5) decane from chloro-1-phenyl-3-propanol-2. Yield 55%. The hydrochloride melts at 140° C.

By substituting other 1- or 2-halo-phenyl-lower-alkanols for the chloro-1-phenyl-3-propanol-2, additional phenyl-hydroxy lower-alkyl compounds are produced.

(d) 1-oxa-2-oxo 3,8-diaza 8-(4'-hydroxy 3'-carbomethoxy benzyl) spiro (4,5) decane from chloromethyl-5-methyl salicylate. Yield 30%. The acid fumarate melts at 225–228° C.

(e) 1-oxa-2-oxo 3,8-diaza 8-(3'-trifluoromethyl phenethyl) spiro (4,5) decane from bromo -1- (trifluoromethyl - 3' - phenyl) - 2-ethane. Yield 58.7%. The corresponding hydrochloride melts at 231–233° C.

(f) 1-oxa-2-oxo 3,8-diaza 8-(4'-fluoro phenethyl) spiro (4,5) decane from p-fluorophenethyl bromide. Yield 43%. The base melts at 152° C. The corresponding hydrochloride melts at 246–248° C.

(g) 1-oxa-2-oxo 3,8-diaza 8-(2'-tetrahydrofuryl propyl) spiro (4,5) decane from chloro-1-(tetrahydrofuryl-2')-3 propane. Yield 42%. The corresponding hydrochloride melts at 227° C.

(h) 1-oxa-2-oxo 3,8-diaza 8-(4'-ethoxy phenyl carbamido methyl) spiro (4,5) decane from N-(p-ethoxyphenyl)-chloroacetamide. Yield 43%. The base melts at 196° C.

By the use of the appropriately substituted chloropropionamide, chloroacetamide or other haloacetamide instead of the one used in this example, compounds having the 8 substituent of this example and numerous of the foregoing examples, except that the lower-alkylene group therein is replaced by carbamidoethyl or carbamidomethyl, are prepared.

(i) 1-oxa-2-oxo 3,8-diaza 8-(2'-pyrimidyl) spiro (4,5) decane

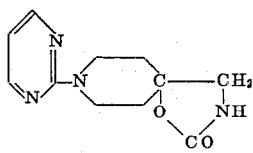

prepared from chloro-2-pyrimidine. Yield 76.6%. The corresponding monohydrochloride melts at 152/155° C.

(j) 1-oxa-2-oxo 3,8-diaza 8-(3',4'-methylene dioxy phenethyl) spiro (4,5) decane

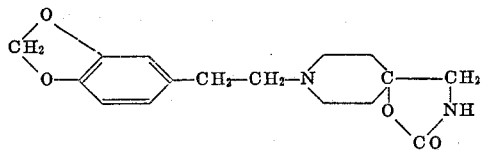

from (3,4-methylene dioxy) phenethyl chloride. Yield 24%. The base melts at 183° C.

Where the foregoing examples produce a compound having a methyl or other lower-alkyl group, it is to be understood that compounds containing other lower-alkyl groups of straight or branched nature and containing up to four carbon atoms inclusive, such as methyl, ethyl, propyl, isopropyl, butyl, sec.-butyl, t.-butyl, are prepared in the same manner by substitution in the process of the appropriate different lower-alkyl starting material. Likewise, where chloro or other halogen atom is present, although chlorine is preferred, further halogen compounds including bromo, chloro, and fluoro compounds are prepared starting from the appropriate halogenated starting material. Similarly, where methoxy or other lower-alkoxy group is present, compounds having other lower-alkoxy groups containing various lower-alkyl groups having up to four carbon atoms inclusive are prepared in the same manner from the appropriate different lower-alkoxy starting material. In the same manner, ortho and meta products are produced instead of the para by utilizing the selected ortho or meta substituted starting material. Similarly, other molecular changes within the scope of the invention are readily made.

It is to be understood that the invention is not to be limited to the exact details of operation or exact compounds, compositions or procedures shown and described, as obvious modifications and equivalents will be apparent to one skilled in the art, and the invention is therefore to be limited only by the scope of the appended claims.

What we claim is:

1. A compound selected from the group consisting of (A) new spiro (4,5) decane derivatives of the general formula:

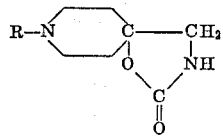

in which R is selected from the group consisting of:
hydrogen,
lower-alkyl containing up to 4 carbon atoms inclusive, and
an Ar—A—grouping
in which Ar and A have the following meaning:
(a) Ar is selected from the group consisting of
phenyl,
phenyl substituted by from 1 to 2 of the following substituents:
a halogen atom, CF3 lower-alkyl containing up to 5 carbon atoms inclusive, lower-alkoxy containing up to 5 carbon atoms inclusive,
methylene dioxy —O—CH$_2$—O—, hydroxy, carbomethoxy —COOCH$_3$, pyrimidyl, and tetrahydrofuryl
(b) A is selected from the group consisting of
a polymethylene chain having up to and including 4 carbon atoms, such a polymethylene chain substituted by phenyl,
such a polymethylene chain containing a double bond,
such a polymethylene chain containing a secondary alcohol group,
such a polymethylene chain separated by an oxygen linkage,
such a polymethylene chain separated by a —CONH— linkage, and
(B) physiologically acceptable acid addition salts thereof.

2. 1-oxa-2-oxo 3,8-diaza spiro (4,5)decane.
3. 1-oxa-2-oxo 3,8-diaza 8-benzyl spiro (4,5) decane.
4. 1-oxa-2-oxo 3,8-diaza 8-phenyllower-alkyl spiro (4,5) decane.
5. 1-oxa-2-oxo 3,8-diaza 8-phenethyl spiro (4,5) decane.
6. 1-oxa-2-oxo 3,8-diaza 8-γ-phenyl propyl spiro (4,5) decane.
7. 1-oxa-2-oxo 3,8-diaza 8-phenyl isopropyl spiro (4,5) decane.
8. 1-oxa-2-oxo 3,8-diaza 8-methyl spiro (4,5) decane.
9. 1-oxa-2-oxo 3,8-diaza 8-cinnamyl spiro (4,5) decane.
10. 1-oxa-2-oxo 3,8-diaza 8-phenoxylower-alkyl spiro (4,5) decane.
11. 1-oxa-2-oxo 3,8-diaza 8-phenoxyethyl spiro (4,5) decane.
12. 1-oxa-2-oxo 3,8-diaza 8-diphenylmethyl spiro (4,5) decane.
13. 1-oxa-2-oxo 3,8-diaza 8-(phenyl-hydroxy lower-alkyl) spiro (4,5) decane.
14. 1-oxa-2-oxo 3,8-diaza 8-(3'-phenyl 2'-hydroxypropyl) spiro (4,5) decane.
15. 1-oxa-2-oxo 3,8-diaza 8-(4' - hydroxy 3' - carbomethoxy benzyl) spiro (4,5) decane.
16. 1-oxa-2-oxo 3,8-diaza 8-(3'-trifluoromethyl phenethyl) spiro (4,5) decane.
17. 1-oxa-2-oxo 3,8-diaza 8-(4'-fluorophenethyl) spiro (4,5) decane.
18. 1-oxa-2-oxo 3,8-diaza 8-(2'-tetrahydrofuryl propyl) spiro (4,5) decane.
19. 1-oxa-2-oxo 3,8-diaza 8-(lower-alkoxyphenylcarbamidolower-alkyl) spiro (4,5) decane.
20. 1-oxa-2-oxo 3,8-diaza 8-(4'-ethoxyphenyl carbamidoethyl) spiro (4,5) decane.
21. 1-oxa-2-oxo 3,8-diaza 8-(2'-pyrimidyl) spiro (4,5) decane.
22. 1-oxa-2-oxo 3,8-diaza 8-(3',4'-methylene dioxy phenethyl) spiro (4,5) decane.

References Cited
UNITED STATES PATENTS

| | | | |
|---|---|---|---|
| 2,437,388 | 3/1948 | Homeyer | 260—307.3 |
| 2,500,714 | 3/1950 | Spielman | 260—294.3 |
| 3,054,794 | 9/1962 | Shapiro et al. | 260—294.3 |
| 3,193,559 | 7/1965 | Regnier et al. | 260—294.3 |
| 3,193,560 | 7/1965 | Regnier et al. | 260—294.3 |

JOHN D. RANDOLPH, *Primary Examiner.*

A. D. SPEVACK, *Assistant Examiner.*